US006615138B1

(12) United States Patent
Schiffmann et al.

(10) Patent No.: US 6,615,138 B1
(45) Date of Patent: Sep. 2, 2003

(54) COLLISION DETECTION SYSTEM AND METHOD OF ESTIMATING MISS DISTANCE EMPLOYING CURVE FITTING

(75) Inventors: Jan K. Schiffmann, Newbury Park, CA (US); Sandeep D. Punater, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/159,959

(22) Filed: May 30, 2002

(51) Int. Cl.[7] .................................................. G08G 1/16
(52) U.S. Cl. ..................... 701/301; 342/70; 342/455; 340/903; 340/917
(58) Field of Search .................. 701/301, 302; 342/70, 455, 457, 71, 72; 340/917, 903

(56) References Cited

U.S. PATENT DOCUMENTS

| | | | |
|---|---|---|---|
| 4,179,696 A | * 12/1979 | Quesinberry et al. | ......... 342/75 |
| 5,249,157 A | 9/1993 | Taylor | ......... 340/903 |
| 6,002,974 A | 12/1999 | Schiffmann | ......... 701/36 |
| 2002/0036584 A1 | * 3/2002 | Jocoy et al. | ......... 342/70 |

OTHER PUBLICATIONS

Song, T. L., "Observability of Target Tracking with Range–Only Measurements," IEEE Journal Oceanic Engineering, vol. 24, No. 3, Jul. 999, pp. 383–387.
Reif, K., Günther, S., Yaz, E., "Stochastic Stability of the Discrete–Time Extended Kalman Filter," IEEE Trans. Automatic Control, vol. 44, No. 4, Apr. 1999, pp. 714–728.
Julier, S., Uhlmann, J., "A New Extension of the Kalman Filter to Nonlinear Systems," Proc. Of AeroSense: The 11th Int. Symp. On Aerospace/Defense Sensing, Simulation and Controls, 1997, 12 pages.
De Geeter, J., Van Brussel, H. De Schutter, J., "A Smoothly Constrained Kalman Filter," IEEE Trans. Pattern Analysis and Machine Intelligence, vol. 19, No. 10, Oct. 1997, pp. 1171–1177.
Gordon, J., Salmond, D., Smith, A., "Novel Approach to Nonlinear/Non–Gaussian Bayesian State Estimation," IEE Proceedings–F, vol. 140, No. 2, Apr. 1993, pp. 107–113.
Richards, P., "Constrained Kalman Filtering Using Pseudo–Measurements," IEE Colloquium on Target Tracking, 1995, pp. 75–79.
Massicotte, D., Morawski, R., Barwicz, A., "Incorporation of a Positivity Constraint into a Kalman–Filter–Based Algorithm for Correction of Spectrometric Data," IEEE Trans. Instrumentation and Measurement, vol. 44, No. 1, Feb. 1995.

\* cited by examiner

*Primary Examiner*—Marthe Y. Marc-Coleman
(74) *Attorney, Agent, or Firm*—Robert M. Sigler; Stefan V. Chmielewski

(57) ABSTRACT

A collision detection system and method of estimating a miss distance of an object are provided. The collision detection system includes a sensor for sensing an object within a field of view and measuring range and range rate of the sensed object. The collision detection system further includes a controller for computing a mathematical square of the range and computing a mathematical square of the product of range and range rate. The controller estimates a miss distance of the object as a function of the computed squared range and the squared product of range and range rate.

30 Claims, 3 Drawing Sheets

COLLISION DETECTION SYSTEM AND METHOD OF ESTIMATING MISS DISTANCE EMPLOYING CURVE FITTING

CROSS-REFERENCE TO RELATED APPLICATION

This application is related to U.S. application Ser. No. 10/158,550, filed on May. 30, 2002, and entitled "COLLISION DETECTION SYSTEM AND METHOD OF ESTIMATING MISS DISTANCE," the entire disclosure of which is hereby incorporated herein by reference.

TECHNICAL FIELD

The present invention generally relates to object collision detection and, more particularly, relates to a vehicle collision detection system and method of estimating the closest point of approach (miss distance) of an object.

BACKGROUND OF THE INVENTION

Automotive vehicles are increasingly being equipped with collision avoidance and warning systems for predicting the potential collision with an external object, such as another vehicle or a pedestrian. Upon detecting a potential collision, such systems typically initiate an action to avoid the collision and/or provide a warning to the vehicle operator. Adaptive cruise control systems have been proposed to track a leading vehicle and automatically control the speed of the following vehicle. The ability to accurately predict an upcoming collision also enables a vehicle controller to control and deploy safety-related devices on the vehicle. For example, upon predicting an anticipated collision or near collision with an object, the vehicle seat belt pretensioner could be activated in a timely manner to pretension the seat belt, thereby enhancing the application of the safety device. The controller could also deploy a warning signal to notify the vehicle driver of a predicted collision with an object.

In conventional vehicle target tracking systems, the host vehicle is generally equipped with a sensor arrangement that acquires range, range rate, and azimuth angle (i.e., direction to target) measurements for each tracked target within a field of view. The sensor arrangement employed in many conventional collision detection systems is generally complex and costly and includes a plurality of radar beams or laser beams covering a field of view. In order to detect an anticipated vehicle collision with an object, the conventional collision detection system generally senses the presence of an object, tracks the movement of the sensed object, and measures the azimuth angle of the object, range to the object, and range rate of the object, all relative to the host vehicle.

The above-mentioned prior known collision detection systems generally require relatively complex and expensive sensor arrangements which use multiple sensors that are required to measure the azimuth angle of the object, relative to the host vehicle, in addition to obtaining the range and range rate measurements. It is generally desirable to reduce the complexity and cost of systems and components employed in automotive vehicles. It is therefore desirable to provide for a vehicle collision detection system which is able to estimate miss distance of an object and predict a potential collision with an approaching object that offers reduced complexity and cost.

SUMMARY OF THE INVENTION

In accordance with the teachings of the present invention, a collision detection system and method of estimating a miss distance of an object are provided. According to one aspect of the present invention, the collision detection system includes a sensor for sensing an object within a field of view. The sensor measures range and range rate of the sensed object. The collision detection system further includes a controller for computing the product of range and range rate and estimating a miss distance of the object as a function of the range and product of range and range rate. According to the embodiment shown, the controller computes a mathematical square of the range and computes a mathematical square of the product of range and range rate for each of a plurality of measurements, and estimates the miss distance of the object as a function of the computed squared range and the squared product of range and range rate.

According to another aspect of the present invention, a method of estimating a miss distance of an object is provided. The method includes the steps of sensing the presence of an object, tracking the sensed object, measuring range to the object for each of a plurality of measurements, and determining range rate of the object for each of the plurality of measurements. The method also includes the steps of computing the product of range and range rate and estimating a miss distance of the object as a function of the range and the product of range and range rate. According to the embodiment shown, the method computes a mathematical square of the range and computes a mathematical square of the product of range and range rate for each of the plurality of measurements, and estimates the miss distance of the object as a function of the computed squared range and the computed squared product of range and range rate.

Accordingly, the collision detection system and miss distance estimation method of the present invention advantageously estimates a miss distance of an object without requiring a complex and costly sensor arrangement, such as those which determine an azimuth angle measurement of the object.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
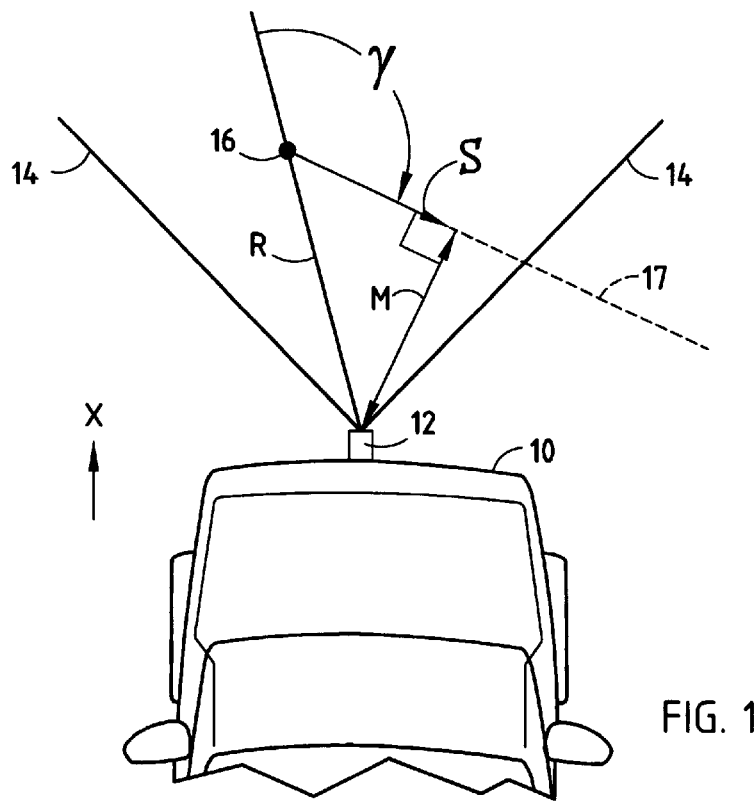
FIG. 1 is a plane view illustrating the geometry of a collision detection system employed on a vehicle according to the present invention.

Referring to FIG. 1, an automotive vehicle 10 is generally illustrated having a collision detection system including a radar sensor 12 mounted thereto to cover a desired field of view 14 in front of the vehicle 10. The vehicle collision detection system senses and tracks one or more objects, such as moving target 16, and estimates a miss distance M for each sensed object. The miss distance M is the closest anticipated distance between the target 16 and the vehicle 10. Using the estimated miss distance M, the collision detection system is able to detect an anticipated collision between the vehicle 10 and the target 16, thereby allowing for responsive action to be taken.

The sensor 12 may include a single sensor or a plurality of sensors arranged to cover the field of view 14 to sense the presence of one or more objects. The sensor 12 also tracks the relative movement of each sensed object within the field of view 14. Sensor 12 further measures the range (radial distance) R to the target object 1, and further measures the range rate (time rate of change of radial distance) $\dot{R}$ of the target object 16. The range R is the measured radial distance between the vehicle 10 and the object 16 which is output from sensor 12 and may include sensor noise. The range rate $\dot{R}$ is the measured rate of change of the range R of the object 16 as a function of time relative to the vehicle 10 which may be output from sensor 12 and may also include noise. Sensor 12 may be a Doppler radar sensor that determines range rate $\dot{R}$ based on the radar Doppler effect. Alternately, the range rate $\dot{R}$ may be determined by computing the time rate of change (i.e., derivative) of sensed range R. Sensor 12 may include a commercially available off-the-shelf wide-beam staring microwave Doppler radar sensor. However, it should be appreciated that other object detecting sensors including other types of radar sensors, video imaging cameras, and laser sensors may be employed to detect the presence of an object, track the relative movement of the detected object, and determine the range and range rate measurements R and $\dot{R}$ that are processed to estimate the miss distance M.

The collision detection system and method of the present invention advantageously determines the miss distance M as a function of the range and range rate measurements R and $\dot{R}$, without the requirement of acquiring an azimuth angle measurement of the object. Thus, the collision detection system of the present invention is able to use a reduced complexity and less costly sensing arrangement.

Figure 2:
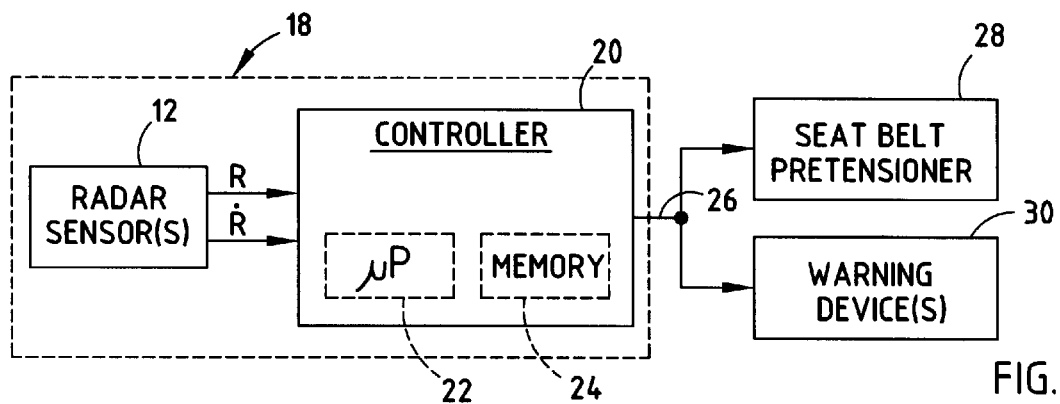
FIG. 2 is a block diagram illustrating the collision detection system.

Referring to FIG. 2, the collision detection system 18 is shown including radar sensor 12 and a controller 20. Controller 20 preferably includes a microprocessor-based controller having a microprocessor 20 and memory 24. Memory 24 may include random access memory (RAM), read-only memory (ROM), and electrically erasable programmable read-only memory (EEPROM). Controller 20 may be a commercially available off-the-shelf controller and may be dedicated to precrash processing or may share processing capability with other vehicle functions.

The controller 20 receives the range measurement R and range rate measurement $\dot{R}$ from the radar sensor 12 and processes the received range and range rate measurements R and $\dot{R}$ with a miss distance estimation and collision detection routine to determine the miss distance M of the target object 16 relative to the host vehicle 10. The collision detection routine may further process the estimated miss distance M to determine whether a potential collision of the object 16 with the vehicle 10 may occur. The controller 20 generates an output signal 26 in the event that an anticipated vehicle collision has been determined. The output signal 26 may be supplied as an input to one or more devices in the vehicle, such as a seat belt pretensioner 28, to activate the device(s) in anticipation of an anticipated upcoming collision. According to the example shown, the seat belt pretensioner 28 may be controlled to pretension the seat belt just prior to the anticipated vehicle collision to eliminate slack in the restraining device. The output signal 26 may be provided to one or more warning devices 30 to warn the vehicle operator and occupants of an anticipated vehicle collision. It should further be appreciated that other devices may be deployed including vehicle air bags, pop-up roll bars, and other safety-related devices.

Figure 3:
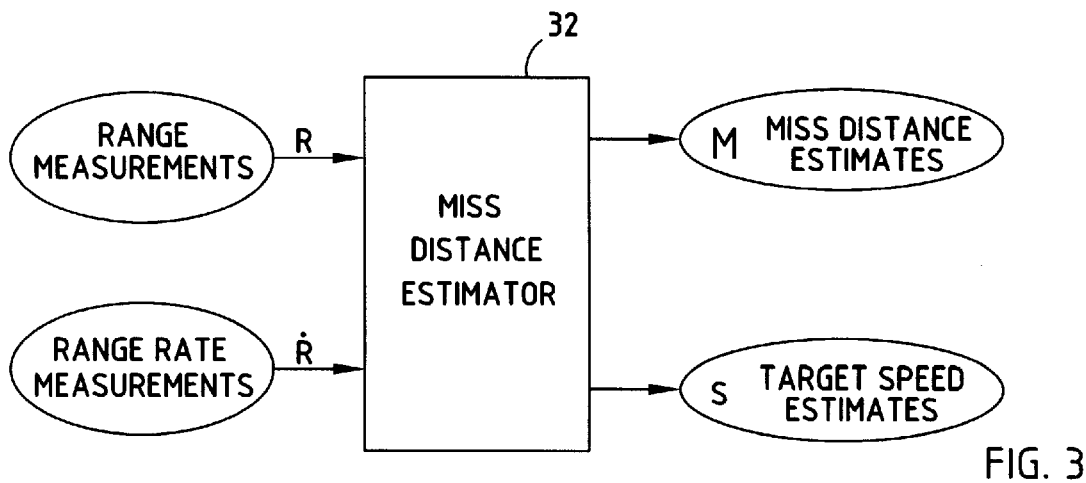
FIG. 3 is a block diagram illustrating the miss distance estimator of the collision detection system.
Figure 4:
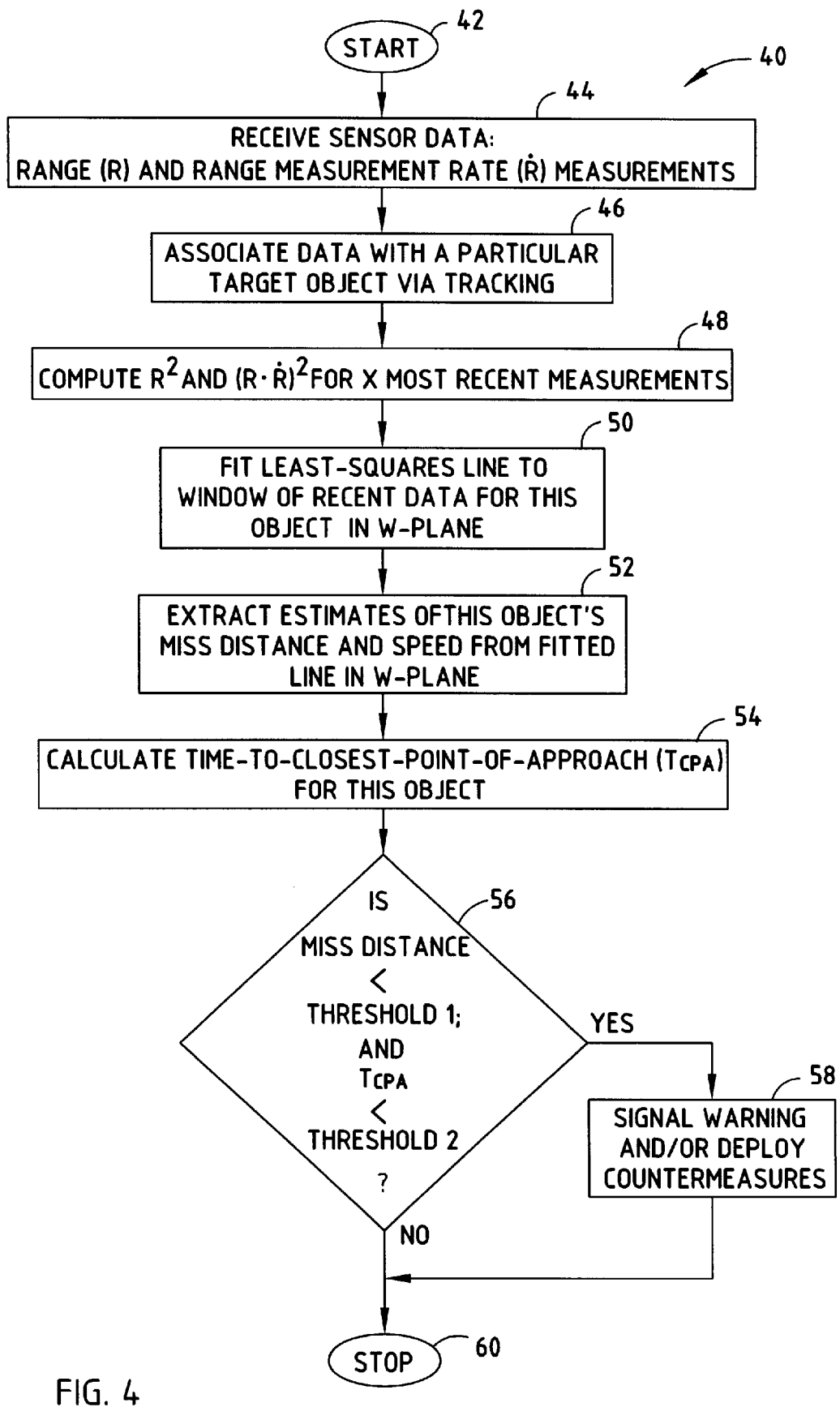
FIG. 4 is a flow diagram illustrating a routine for estimating and using the miss distance in collision detection according to the present invention.

Referring to FIG. 3, a miss distance estimator 32 is generally shown receiving the range measurement R and range rate measurement $\dot{R}$, both generated by sensor 12. The range and range rate measurements R and $\dot{R}$ are processed by the estimator 32, which includes a programmed routine as shown in FIG. 4 and described below, to estimate the miss distance M. In addition, the miss distance estimator 32 may also estimate speed S of the target (object).

The miss distance estimation of the present invention assumes that the target object is moving straight and at a constant speed relative to the host vehicle. The target object heading (i.e., the direction of speed S) is assumed to be constant, however, if the target object 16 is not moving directly toward or away from the host vehicle 10, then the radial angle is changing. Hence, the miss angle γ is changing and the range rate $\dot{R}$ is changing. The miss angle γ is the angle between a line extending radially from the vehicle 10 to the object 16 and a line 17 in the direction of movement of the object 16. If exact measurements of range R and range rate $\dot{R}$ are available at time instant k and k+1, the speed of the object can be obtained.

Referring to FIG. 4, a routine 40 is illustrated for estimating the miss distance M of a target object and determining a collision detection signal 26. Routine 40 begins at step 42 and proceeds to step 44 to receive the sensor measurement data including the range measurement R and range rate measurement $\dot{R}$ for each object sensed within the sensor field of view. Next, in step 46, routine 40 associates data with the particular target object by way of an object tracker. The object tracker tracks each object based on the combination of range and range rate measurements R and $\dot{R}$. If the current range and range rate measurements R and $\dot{R}$ are sufficiently close in value to the predicted range and range rate values, the object measurement is assumed to pertain to the same object. The tracking of each detected object allows for a consistent stream of measurement data at incremental time periods k, k+1, k+2, etc. for each sensed object.

Proceeding to step 48, routine 40 computes a mathematical square of the range R as shown by $R^2$, and also computes a mathematical square of the product of range and range rate as shown by $(R \cdot \dot{R})^2$ for each of X number of most recent measurements for a tracked object. The squared range and squared product of range and rate values $R^2$ and $(R \cdot \dot{R})^2$, respectively, for each of X measurements are preferably stored in memory and are processed by controller 20 as explained herein. It should be appreciated that the number (X) of measurements may include thirty (30), according to one example, or may include fewer or greater number of measurements. Processing of a greater number of measurements may result in less noise, but may be less responsive to maneuvers between the object and the host vehicle. Accordingly, the number (X) of measurements selected is a compromise and may vary depending on the application.

Figure 5:
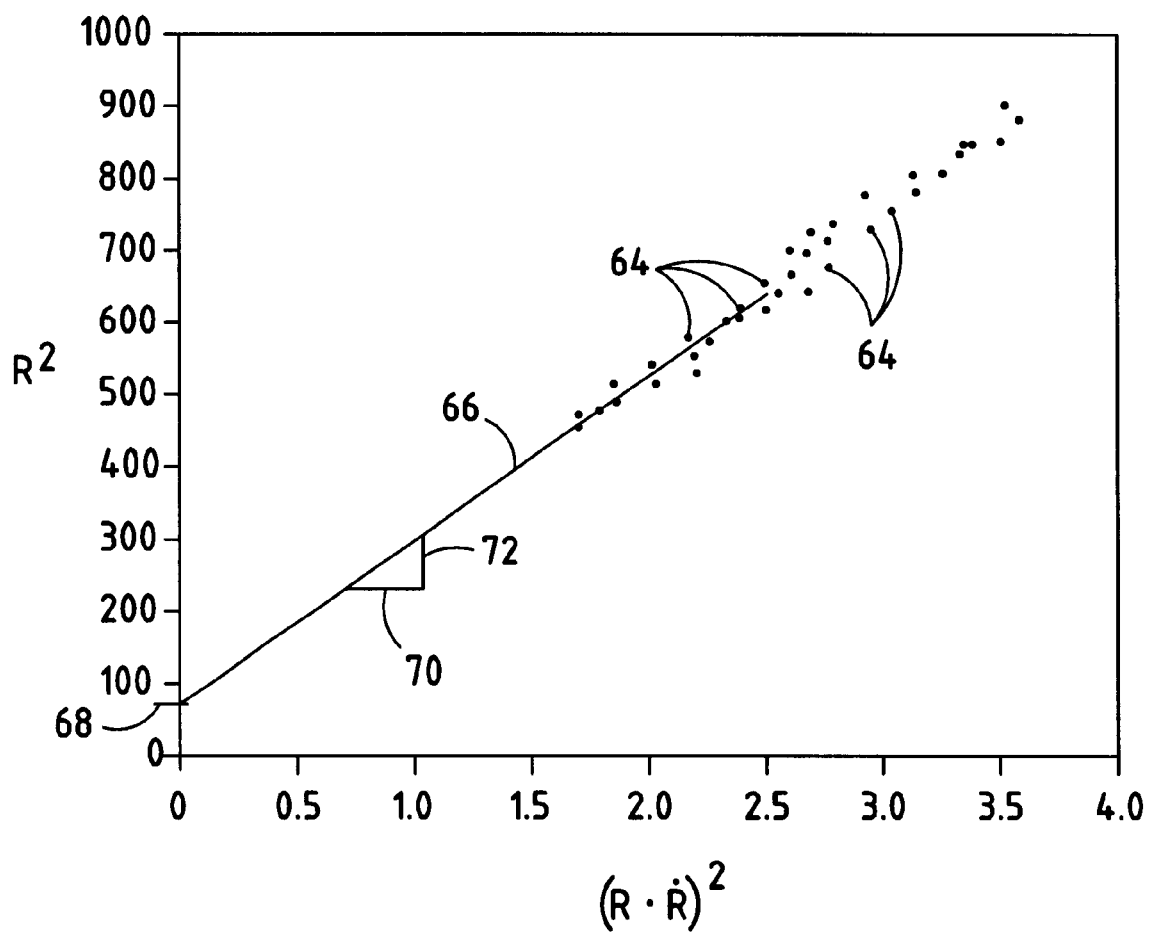
FIG. 5 is a graph illustrating estimation of the miss distance using a curve in a plane defined by range squared and the product of range and range rate squared.

Proceeding to step 50, routine 40 generates a least-squares fit line (curve) for a window of recent data for the tracked object in a plane, referred to herein as the W-plane. The W-plane is defined as a plane having data plotted on X-axis and Y-axis coordinates, such as is shown in FIG. 5. The Y-axis coordinate represents the squared range $R^2$ values, while the X-axis coordinate represents the squared product of range and rang rate $(R \cdot \dot{R})^2$ values. The pairs of computed values for each data measurement may be plotted in the W-plane as shown by points 64 for X number of measurements. A least-squares fit line 66 is generated based on a close fit to the plurality of plotted measurements 64. While a least-squares fit line is shown and described herein, it should be appreciated that other curves, both linear and non-linear, may be defined based on the pairs of data for X measurements 64, without departing from the teachings of the present invention. While a plot is shown in a W-plane, it should be appreciated that the controller 20 may process the data without providing a viewable plot, as the plot is merely illustrative of the processing of the data provided by a microprocessor-based controller 20.

In step 52, routine 40 extracts estimates of the miss distance M and speed S of the object from the fitted line 66 shown in the W-plane. As seen in FIG. 5, the curve 66 crosses the vertical axis defined by the squared range $R^2$ at a point 68 when the squared product of range and range rate $(R \cdot \dot{R})^2$ is equal to zero. At point 68, when the squared product of range and range rate is equal to zero, the miss distance M is defined as the square root of the squared range $R^2$ value ($M = \sqrt{R^2}$). Thus, point 68 is the measured point at which the object reaches the closest anticipated point of approach to the host vehicle. In the event that point 68 crosses the squared range $R^2$ axis at a negative value, $R^2$ is set to a value of zero.

The miss distance M and speed S may be estimated from an interpretation of the fitted curve 66. This relationship, according to one embodiment, is shown in the following equation:

$$R^2 = M^2 + \frac{1}{S^2}(R \cdot \dot{R})^2$$

wherein $$\frac{1}{S^2}$$

represents the slope of curve 66 as defined by horizontal segment 70 and vertical segment 72. Accordingly, the speed S of the object relative to the vehicle may be estimated based on the slope of curve 66. It should be appreciated that the miss distance M is the distance that the target object would have come closest to the vehicle 10 if the object continued along the instantaneous curve. For a target object which is moving straight at constant speed, the points plotted in the W-plane form a straight line with an intercept on the $R^2$ axis having a value equal to $M^2$ and with a slope of $$\frac{1}{S^2}.$$

While a straight line curve 66 is shown, it should be appreciated that some higher-order curve may be employed to define the relationship of the sample point.

Referring back to FIG. 4 and proceeding to step 52, routine 40 calculates the time to closest point-of-approach $T_{CPA}$ for the target object. The time to closest point-of-approach $T_{CPA}$ can be calculated based on range, range rate, and a calculated acceleration of the object in the radial direction. Next, in decision step 56, routine 40 determines if the following two conditions are met: (1) is estimated miss distance less than threshold 1; and (2) is $T_{CPA}$ less than threshold 2. If both conditions are met in step 56, routine 40 generates an output signal to provide a signal warning or to deploy countermeasures in step 58. The countermeasures may include pretensioning a seat belt pretensioner, providing a warning, or initiating other appropriate action. It should be appreciated that the estimated miss distance M may be used to determine if an imminent collision is anticipated or may be employed to determine if a close collision is anticipated. By estimating the time to closest point-of-approach $T_{CPA}$, the time of an anticipated collision or a near collision event can be monitored and employed to timely employ any safety devices such as a seat belt pretensioner. If either of the above conditions in step 56 is not met, routine 40 ends at step 60.

The miss distance estimation of the present invention assumes that the target object 16 is moving straight and at a constant speed relative to the host vehicle 10. If variations in speed and/or direction of the object 16 occur relative to the host vehicle 10, the successive instantaneous measurements will account for variations in direction or speed. While the miss distance estimation has been described in connection with a linear curve 66, it should be appreciated that higher-order curves (e.g., parabolas) may be employed. It should further be appreciated that the use of a weighting matrix in the curve fitting process (e.g., based on the inverse of range squared), and accounting for the correlation between errors in the two W-plane quantities in the curve fitting process may also be provided.

Accordingly, the collision detection system 18 and method 40 of estimating miss distance according to the present invention advantageously estimates the miss distance M of a target object without requiring the measurement of an azimuth angle of the object. As a consequence, the present invention is able to employ less complex and less expensive sensing components, thus providing cost savings. By processing the estimated miss distance M, the collision detection system 18 advantageously estimates an anticipated collision and allows for timely responsive action to be taken.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A collision detection system comprising:
   a sensor for sensing an object in a field of view and measuring range to the object and further determining range rate of the object; and
   a controller for computing the product of range and range rate for each of a plurality of measurements, said controller further estimating a miss distance of the object as a function of the range and the product of range and range rate.

2. The collision detection system as defined in claim 1, wherein the controller further computes a mathematical square of the range and computes a mathematical square of the product of range and range rate for each of the plurality of measurements, said controller estimating the miss distance of the object as a function of the computed squared range and the squared product of range and range rate.

3. The collision detection system as defined in claim 2, wherein the controller further computes a curve based on the computed squared range and the squared product of range and range rate for the plurality of measurements, wherein the estimated miss distance is determined based on the curve.

4. The collision detection system as defined in claim 3, wherein the estimated miss distance is determined based on the curve when the squared product of range and range rate is equal to zero.

5. The collision detection system as defined in claim 1, wherein the controller estimates the miss distance absent an azimuth angle measurement of the object.

6. The collision detection system as defined in claim 1, wherein the sensor comprises a radar sensor, wherein the range rate is determined based on a radar Doppler effect.

7. The collision detection system as defined in claim 1, wherein the sensor comprises a plurality of sensors.

8. The collision detection system as defined in claim 1, wherein the estimated miss distance is the expected distance to the object at the closest point of approach.

9. The collision detection system as defined in claim 1, wherein the controller compares the miss distance to a threshold and generates a collision output signal as a function of the comparison.

10. A vehicle collision detection system comprising:
a sensor located on a vehicle for sensing an object in a field of view and measuring range to the object relative to the vehicle and further determining range rate of the object relative to the vehicle; and
a controller for computing a mathematical square of the range and computing a mathematical square of the product of range and range rate for each of a plurality of measurements, said controller further estimating a miss distance of the object relative to the vehicle as a function of the computed squared range and the squared product of range and range rate.

11. The vehicle collision detection system as defined in claim 10, wherein the controller further computes a curve based on the plurality of computed squared range and the squared product of range and range rate, wherein the estimated miss distance is determined based on the curve.

12. The vehicle collision detection system as defined in claim 11, wherein the estimated miss distance is determined based on the curve when the squared product of range and range rate is equal to zero.

13. The vehicle collision detection system as defined in claim 10, wherein the controller estimates the miss distance absent an azimuth angle measurement of the object.

14. The vehicle collision detection system as defined in claim 10, wherein the estimated miss distance is the expected distance between the object and the vehicle at the closest point of approach.

15. A method of estimating a miss distance of an object, said method comprising the steps of:
sensing the presence of an object;
tracking the object;
measuring range to the object for each of a plurality of measurements;
determining range rate of the object for each of the plurality of measurements;
computing the product of range and range rate for each of the plurality of measurements; and
estimating a miss distance of the object as a function of the range and the product of range and range rate.

16. The method as defined in claim 15 further comprising the steps of:
computing a mathematical square of range for each of the plurality of measurements; and
computing a mathematical square of the product of range and range rate for each of the plurality of measurements, wherein the miss distance is estimated as a function of the computed squared range and the squared product of range and range rate.

17. The method as defined in claim 16 further comprising the step of defining a curve based on the computed squared range and the squared product of range and range rate for the plurality of measurements.

18. The method as defined in claim 17, wherein the step of estimating the miss distance comprises estimating the miss distance based on the curve when the squared product of range and range rate is equal to zero.

19. The method as defined in claim 18 further comprising the step of plotting values of the computed squared range versus the squared product of range and range rate, wherein the curve is generated based on the plotted values.

20. The method as defined in claim 19 further comprising the step of estimating speed of the object as a function of slope of the curve.

21. The method as defined in claim 19, wherein the curve is generated based on a least-squares fit line of the plotted measurements.

22. The method as defined in claim, 15 wherein the step of estimating the miss distance is performed absent an azimuth angle measurement of the object.

23. The method as defined in claim 15, wherein the method estimates the miss distance of an object relative to a vehicle.

24. The method as defined in claim 23, wherein the estimated miss distance is the expected distance to the object at the closest point of approach to the vehicle.

25. The method as defined in claim 15 further comprising the step of comparing the miss distance to a threshold and generating a collision output signal as a function of the comparison.

26. A method of estimating a miss distance of an object relative to a vehicle, said method comprising the steps of:
sensing the presence of an object relative to a vehicle;
tracking the object;
measuring range to the object for each of a plurality of measurements;
determining range rate of the object for each of the plurality of measurements;
computing a mathematical square of the range for each of the plurality of measurements;
computing a mathematical square of the product of range and range rate for each of the plurality of measurements; and
estimating a miss distance of the object relative to the vehicle as a function of the computed squared range and the squared product of range and range rate.

27. The method as defined in claim 26, wherein the step of estimating the miss distance is performed absent an azimuth angle measurement of the object relative to the vehicle.

28. The method as defined in claim 26 further comprising the step of comparing the miss distance to a threshold and generating a collision output signal as a function of the comparison.

29. The method as defined in claim 26 further comprising the step of defining a curve based on the computed squared range and the squared product of range and range rate for each of the plurality of measurements, wherein the step of estimating the miss distance comprises estimating the miss distance based on the curve when the squared product of range and range rate is equal to zero.

30. The method as defined in claim 29, wherein the curve is generated based on a least-squares fit line in relation to the plurality of measurements.

* * * * *